(12) United States Patent
Andreasen et al.

(10) Patent No.: US 10,449,817 B2
(45) Date of Patent: Oct. 22, 2019

(54) SLIDER WEAR PAD

(71) Applicant: Hendrickson USA, L.L.C., Itasca, IL (US)

(72) Inventors: Jacob D. Andreasen, Akron, OH (US); John E. Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 58 days.

(21) Appl. No.: 15/966,043

(22) Filed: Apr. 30, 2018

(65) Prior Publication Data

US 2018/0334004 A1 Nov. 22, 2018

Related U.S. Application Data

(60) Provisional application No. 62/507,949, filed on May 18, 2017.

(51) Int. Cl.
*B60G 13/04* (2006.01)
*B60G 9/00* (2006.01)
*B62D 21/03* (2006.01)
*B62D 53/06* (2006.01)

(52) U.S. Cl.
CPC .............. *B60G 13/04* (2013.01); *B60G 9/00* (2013.01); *B60G 9/003* (2013.01); *B62D 21/03* (2013.01); *B62D 53/068* (2013.01); *B60G 2204/15* (2013.01); *B60G 2204/4232* (2013.01); *B60G 2300/02* (2013.01); *B60G 2300/026* (2013.01); *B60G 2300/042* (2013.01); *B60G 2300/40* (2013.01)

(58) Field of Classification Search
CPC .......... B60G 13/04; B60G 9/00; B60G 9/003; B60G 2204/15; B62D 21/02; B62D 21/03
See application file for complete search history.

(56) References Cited

U.S. PATENT DOCUMENTS

| | | | |
|---|---|---|---|
| 4,919,445 A | | 4/1990 | Robey |
| 5,221,103 A | | 6/1993 | Ehrlich |
| 5,378,006 A | * | 1/1995 | Stuart ..................... B62D 21/14 280/149.2 |
| 5,474,149 A | * | 12/1995 | Schueman ............. B60G 5/005 180/209 |
| 5,507,511 A | * | 4/1996 | Schueman ............. B60G 5/005 180/209 |

(Continued)

*Primary Examiner* — Faye M Fleming
(74) *Attorney, Agent, or Firm* — Dureska & Moore, LLC; David P. Dureska; Greg Strugalski

(57) ABSTRACT

A slider suspension system for a heavy-duty vehicle includes a slider assembly with a main member that is movable relative to a primary frame of the heavy-duty vehicle in a first direction along the extent of the main member. The main member has a first portion and a second portion extending transverse to the first portion. A friction reducing slider wear pad is fixed to the main member and interposed between the main member and the primary frame. The friction reducing slider wear pad has a first segment fixed to the first portion of the main member. The friction reducing slider wear pad also has a second segment engaging at least a part of the second portion of the main member to inhibit movement of the friction reducing pad relative to the main member in a second direction transverse to the first direction.

16 Claims, 5 Drawing Sheets

(56) References Cited

U.S. PATENT DOCUMENTS

| | | | |
|---|---|---|---|
| 5,531,467 A * | 7/1996 | Schueman | B60G 5/005 |
| | | | 180/209 |
| 5,720,489 A | 2/1998 | Pierce et al. | |
| 5,785,486 A | 7/1998 | McNeilus et al. | |
| 6,213,489 B1 * | 4/2001 | Eckelberry | B62D 53/068 |
| | | | 180/209 |
| 7,198,298 B2 | 4/2007 | Ramsey | |
| 8,272,654 B2 * | 9/2012 | Xie | B62D 53/067 |
| | | | 280/149.2 |
| 8,496,259 B2 | 7/2013 | Ramsey | |
| 9,555,844 B2 * | 1/2017 | Hicks | B60G 99/002 |

* cited by examiner

SLIDER WEAR PAD

CROSS-REFERENCE TO RELATED APPLICATIONS

This application claims the benefit of U.S. Provisional Patent Application Ser. No. 62/507,949 filed on May 18, 2017.

TECHNICAL FIELD

The subject disclosure relates generally to heavy-duty vehicle slider assemblies. In particular, the subject disclosure relates to a slider assembly having improved slider wear pads.

BACKGROUND

Slider assemblies are known in the heavy-duty vehicle industry. Slider assemblies are typically used on heavy-duty vehicles, such as trailers, tractor-trailers or semi-trailers. A slider assembly typically has longitudinally extending main members and transverse cross members forming a subframe. One or more axle/suspension systems depend from the subframe. The slider assembly is mounted on the underside of a heavy-duty vehicle, for example to a primary frame of a trailer. The slider assembly is movable longitudinally relative to the primary frame of the heavy-duty vehicle to increase maneuverability and distribute a load carried by the heavy-duty vehicle. Once moved to a desired relative position, the slider assembly is maintained in place relative to the heavy-duty vehicle, usually by a lock pin mechanism.

The main members of the slider assembly are longitudinally moveable relative to the primary frame of the heavy-duty vehicle. A slider wear pad was developed and interposed between the slider assembly and the primary frame of the heavy-duty vehicle to aid or facilitate relative movement. The slider wear pad is made from a material with a relatively low coefficient of friction. Each one of a pair of slider wear pads extends substantially the entire length of a respective main frame member of the slider assembly. Typically, the slider wear pads are attached to each main frame member by recessed fasteners, such as screws or bolts, to an upward facing surface of a respective main frame member of the slider assembly.

A heavy-duty vehicle having a slider assembly may be subject to relatively large lateral or side loads that may be encountered, for example, during a turn and/or roll. These relatively large lateral or side loads acting through the slider assembly can be significant. The heavy-duty vehicle having a slider assembly is also subjected to vertical and longitudinal loads.

The known slider wear pads suffer from several limitations, disadvantages and drawbacks. For example, when a slider wear pad is exposed to elevated temperatures, it can possibly expand longitudinally and break free from the fasteners attaching it to main frame members of the slider assembly. If a slider wear pad encounters lateral or side loads during turning or rolling, the slider wear pad can move laterally from between the heavy-duty vehicle primary frame and a main frame member of the slider assembly. This relative lateral movement of the slider wear pad is referred to as "scrubbing". If the slider wear pad is displaced laterally enough to become ineffective to reduce friction, normally easy longitudinal movement of the slider assembly relative to the heavy-duty vehicle primary frame can be adversely affected, hindered and result in less than optimal functioning and performance of the slider wear pad and slider assembly.

Therefore, there is a need for an improved slider wear pad that can overcome the limitations, disadvantages and drawbacks of previously known slider wear pads. An improved slider wear pad of the subject disclosure satisfies this need.

SUMMARY

A summary is provided to introduce concepts of at least one aspect of the subject disclosure. The summary is not intended to identify key factors or essential features of the subject disclosure, nor is it intended to limit the scope, function or implementation of the subject disclosure.

The subject disclosure is directed to a slider suspension system assembly for a heavy-duty vehicle. A slider box has at least one elongate main member that is movable relative to a primary frame of the heavy-duty vehicle in a first direction along the extent of the main member. The main member has a first portion facing the primary frame of the heavy-duty vehicle. The main member has a second portion extending substantially perpendicular to the first portion. The first portion of the main member joins the second portion at a transition portion. At least one friction reducing slider wear pad is interposed between the main member of the slider box and the primary frame of the heavy-duty vehicle. The friction reducing slider wear pad has a first segment fixed to the first portion of the main member. The friction reducing slider wear pad also has a second segment formed and disposed to engage at least a part of the transition portion of the main member. Such engagement prevents or minimizes movement of the friction reducing slider wear pad relative to the main member in a second direction transverse to the first direction.

The friction reducing slider wear pad may be made from a polymeric material. The polymeric material may be an ultra-high molecular weight polyethylene. A pair of friction reducing slider wear pads may be attached to a main member. Each friction reducing slider wear pad has a length less than one half of the length of the main member. The transition portion of the main member is adapted to be disposed in an outboard direction of the heavy-duty vehicle.

DRAWINGS

The following description and drawings set forth certain illustrative aspects and implementations of the subject disclosure. The drawings are indicative of various ways in which one or more aspects or implementations of the subject disclosure may be employed. Further features of the subject disclosure will become apparent to those skilled in the art from reading the following description with reference to the accompanying drawings, in which.

DESCRIPTION

The subject disclosure is described with reference to the drawings, in which like numerals are used to refer to like elements throughout the description and drawings. For exemplary purposes, details are set forth in order to provide an understanding of the subject disclosure. It will be appreciated, however, that the concepts of the subject disclosure may be practiced and implemented without these specific details.

Figure 1:
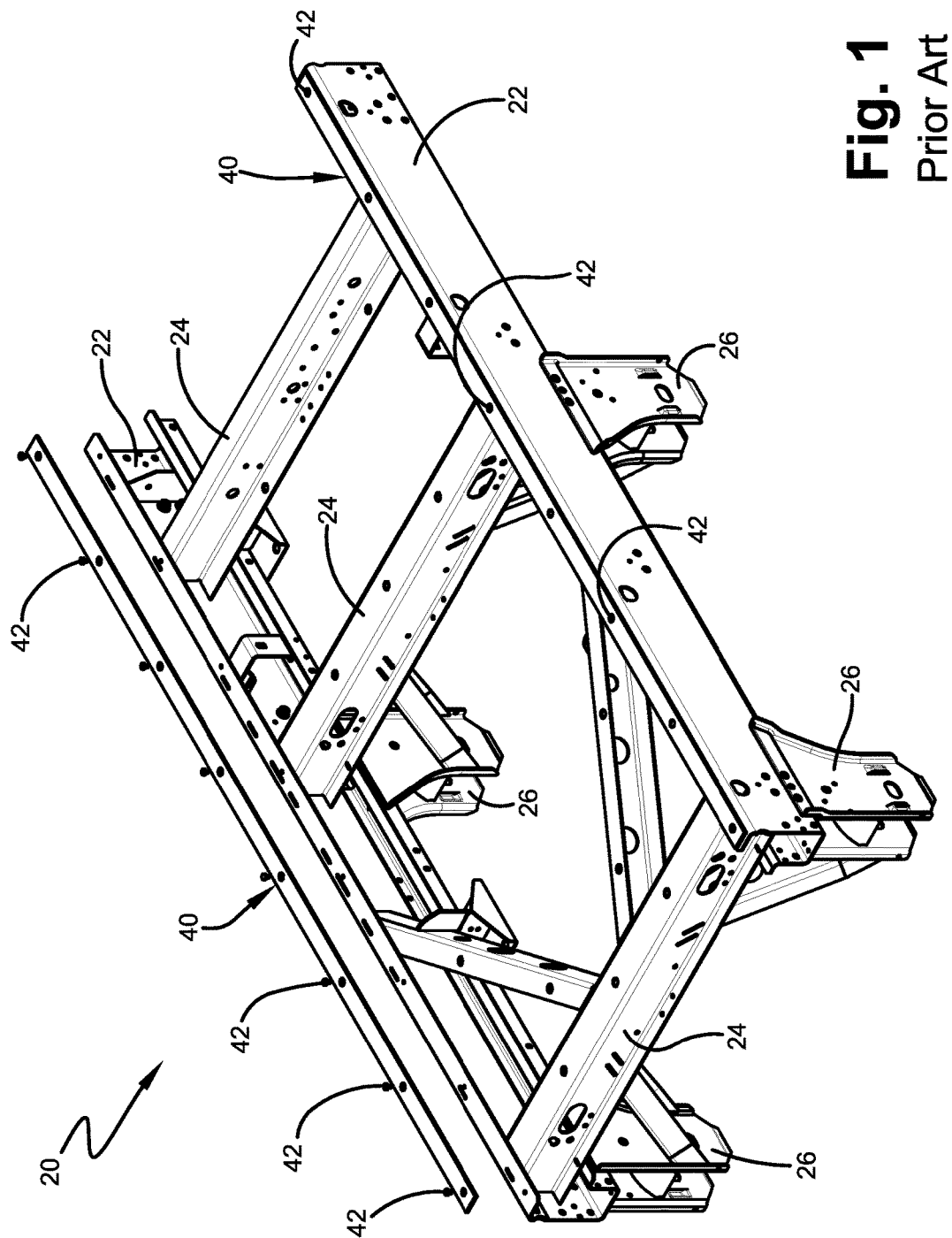
FIG. 1 is a partially exploded perspective view of a slider assembly showing a prior art slider wear pad attached to a frame of the slider assembly and another prior art slider wear pad detached from the frame of the slider assembly.

In order to better understand the structure and function of a slider assembly for use on a heavy-duty vehicle (not shown), a prior art slider assembly 20 is illustrated in FIG. 1. As is known, heavy-duty vehicles include tractors, trailers, tractor-trailers and semi-trailers and the like. Throughout, reference shall be made to a heavy-duty vehicle with the understanding that such reference includes trucks, tractor-trailers, semi-trailers and trailers.

The prior art slider assembly 20 includes a pair of elongated, transversely spaced and parallel extending main members 22. The main members 22 extend in a longitudinal direction when mounted to a primary frame (not shown) of the heavy-duty vehicle, such as a trailer. The prior art slider assembly 20 also includes a plurality of spaced apart and parallel cross-members 24 extending transversely or laterally relative to the main members 22 and connecting the main members together.

The prior art slider assembly 20 further includes two pairs of hangers 26 depending from the main members 22 at about the longitudinal location of respective cross-members 24. Each pair of the hangers 26 suspends a respective axle/suspension system (not shown), as is known. While two pairs of hangers 26 are illustrated in FIG. 1, it will be appreciated that any suitable number of pairs of hangers 26 may be provided on the prior art slider assembly 20. The prior art slider assembly 20 generally includes at least one selectively retractable and/or engageable lock pin mechanism (not shown) to permit or prevent longitudinal movement of the prior art slider assembly relative to a primary frame (not shown) of the heavy-duty vehicle. The prior art slider assembly 20 may include other reinforcing structures connecting and extending between the main members 22 and the cross-members 24, as is known.

Each main member 22 of the prior art slider assembly 20 is a generally C-shaped channel structure beam made of a metal material, such as steel or other suitable metal. The cross-members 24, the hangers 26 and the lock pin mechanism are also formed of a similar tough metal. The open portions of each C-shaped main member 22 face one another when connected together by the cross-members 24. Each end of each cross member 24 nests in the open portion of a respective main member 22 and is secured by suitable means such as welding or mechanical fastening. As is known, a plurality of rail guides (not shown) are mounted to outboard facing sides of each main member 22. Each of the rail guides of the slider assembly 20 receive an elongate and longitudinally extending rail (not shown) on the primary frame of the heavy-duty vehicle to help maintain the relative position between the slider assembly and main members 22 of the primary frame and guide a main member along the primary frame.

A low friction strip 40 is attached to the uppermost surface of each respective main member 22 by a plurality of evenly spaced apart and recessed fasteners 42. Each low friction strip 40 extends substantially for the entire length of a respective main member 22. Each low friction strip 40 is formed of any suitable low friction polymeric material, such as ultra-high molecular weight polyethylene. The low friction strip 40 may also be referred to as a slider wear pad.

The prior art slider assembly 20 is mounted under a primary frame of the heavy-duty vehicle for relative longitudinal movement. The prior art slider assembly 20 slidably engages spaced apart, parallel and longitudinally extending primary frame members on the underside of the heavy-duty vehicle. Each low friction strip 40 abuts the bottom surface of the respective primary frame member of the heavy-duty vehicle to provide a smooth, relatively low friction contact surface for slidable movement of the prior art slider assembly 20 relative to the primary frame members. The prior art slider assembly 20 is positioned relative to the primary frame members for a desired load distribution or vehicle maneuverability and is retained by at least one selectively retractable and/or engageable lock pin mechanism (not shown), in a known manner.

Heavy-duty vehicles may be subject to longitudinal, vertical and lateral or side loads transmitted through the low friction strips 40 during maneuvers, such as turning or trailer roll. The lateral or side loads especially can adversely affect the low friction strips 40. The lateral or side loads on the low friction strip 40 of the prior art slider assembly 20 can be significant. However, in addition to the lateral and side loads, the prior art slider assembly 20 and low friction strips 40 must be capable of withstanding vertical and longitudinal loads. The ability of such prior art slider assemblies 20 and prior art low friction strips 40 to withstand lateral, vertical and longitudinal loads is less than optimum and ultimately can reduce the service life of the prior art low friction strips.

While generally suitable for their intended use, the known low friction strips 40 may suffer from several limitations, disadvantages and drawbacks. For example, when a low friction strip 40 is exposed to elevated temperatures, that can result from various causes, it tends to expand longitudinally. Such longitudinal expansion can possibly loosen or break the low friction strip 40 free from the fasteners 42 that attach the low friction strip to the respective main member 22 of the prior art slider assembly 20. When a loosened low friction strip 40 encounters lateral loads from the heavy-duty vehicle, the loosened low friction strip can move laterally and be forced out from between the primary frame of the heavy-duty vehicle and a main member 22 of the prior art slider assembly 20. Also, the lateral loads the low friction strips 40 encounter due to during turning or trailer roll of the heavy-duty vehicle may cause the low friction strips 40 to move laterally from between the primary frame of the heavy-duty vehicle and the main member 22 of the prior art slider assembly or be deformed or extruded. Such loosened and/or displaced prior art low friction strips 40 make it difficult to allow smooth relative movement between the prior art slider assembly 20 and the primary frame of the heavy-duty vehicle. It is generally advisable to remove the loosened and/or displaced prior art low friction strips 40 and replace them with new prior art low friction strips. This requires taking the heavy-duty vehicle out of service for the repairs which may lead to lost service and/or lost revenue.

The subject disclosure is directed to a slider subframe or slider assembly 120 for a heavy-duty vehicle. The heavy-duty vehicle typically has a primary frame that includes a pair of spaced-apart, parallel and longitudinally extending primary frame members 100 (only one shown in FIGS. 3 and 5). The primary frame members 100 are interconnected by primary frame cross-members (not shown).

Figure 2:
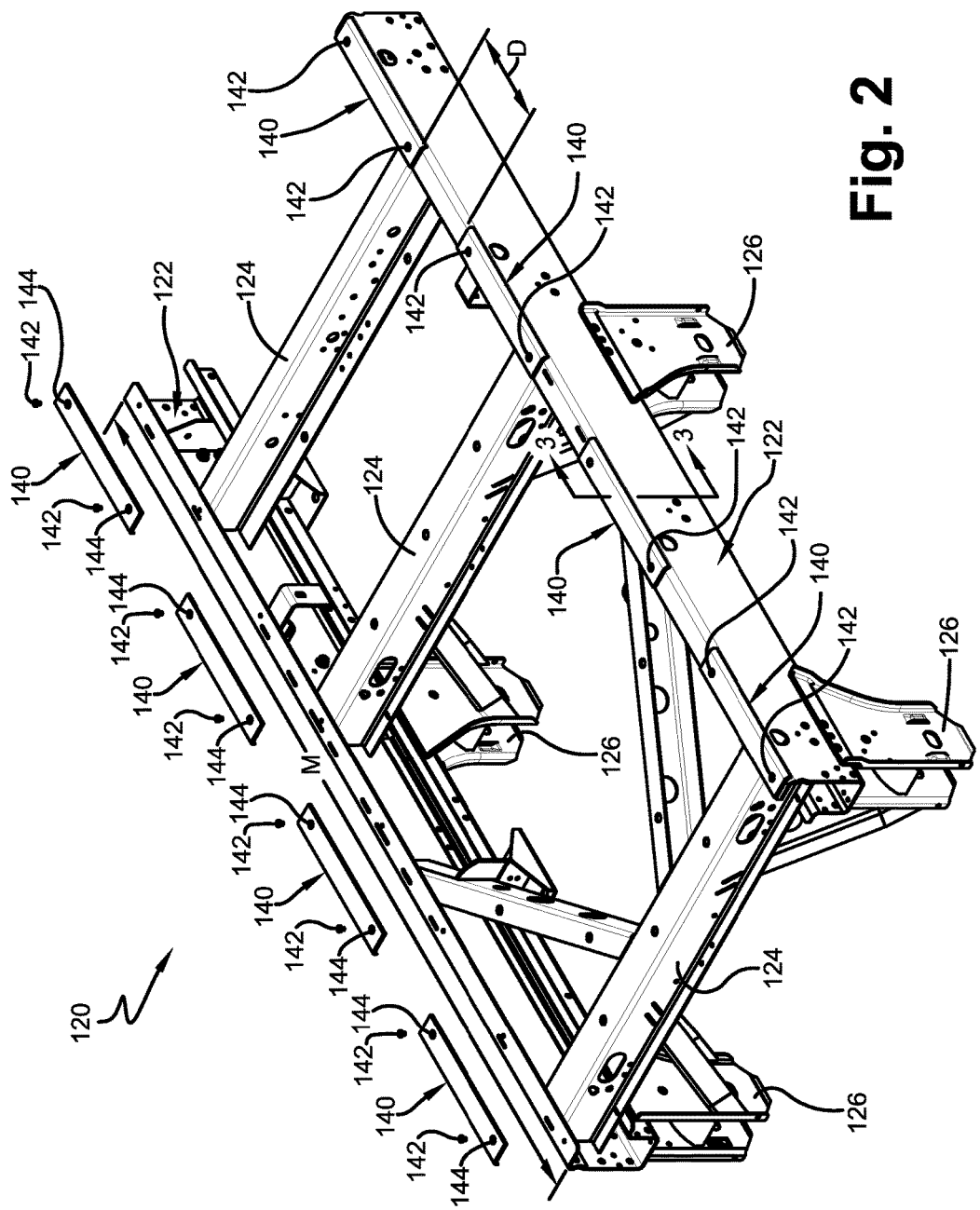
FIG. 2 is a partially exploded perspective view of a slider assembly incorporating several improved friction reducing slider wear pads, constructed according to the subject disclosure, shown attached to a frame of the slider assembly and several other slider wear pad shown detached from the frame.

The slider subframe or slider assembly 120 for use with a heavy-duty vehicle (not shown) that incorporates improved friction reducing slider wear pads 140 according to an aspect of the subject disclosure is illustrated in FIG. 2. As is known, heavy-duty vehicles include trucks, trailers, tractor-trailers, semi-trailers and the like. Slider assemblies are mostly used on trailers, however, reference will be made throughout to "heavy-duty vehicle(s)" that is intended to include trucks, trailers, tractor-trailers, semi-trailers and the like.

The slider subframe or slider assembly 120 carries a desired number of axle/suspension systems (not shown), as is known. The slider assembly 120 is mounted to the primary frame of the heavy-duty vehicle. Specifically, the slider assembly 120 is operatively mounted to the main primary frame members 100 of the primary frame for relative longitudinal movement of at least a portion of the slider assembly by slidable engagement with the main primary frame members of the heavy-duty vehicle. The axle/suspension systems do not necessarily have to be mounted to the slider assembly 120 for the purposes of the subject disclosure.

The slider assembly 120 includes a pair of spaced apart and parallel extending elongated slider main members 122. The slider main members 122 are adapted to extend in a longitudinal direction of the heavy-duty vehicle when mounted to the primary frame. The slider assembly 120 also includes a plurality of spaced apart and parallel extending slider cross-members 124 extending transversely relative to the slider main members 122 and connecting together the slider main members. The slider assembly 120 may include other reinforcing and connecting structures, as is known. The slider main members 122 and slider cross-members 124 are formed of any suitable strong and tough material, such as steel, other metals or composite material.

The slider assembly 120 further includes, for example, two pairs of hangers 126 depending from the slider main members 122 for suspending a pair of axle/suspension systems, as is known. It will be appreciated that any suitable number of pairs of hangers 126 may be provided on the slider assembly 120 to accommodate a desired number of axle/suspension systems to be used on the heavy-duty vehicle. The hangers 126 are formed of any suitable material, such as a metal like steel.

The slider assembly 120 may include at least one movable lock pin mechanism (not shown) to selectively retract from, or engage with, portions of the slider assembly and the primary frame of the heavy-duty vehicle to permit or prevent longitudinal movement of the slider assembly relative to the primary frame. The lock pin mechanism is formed from any suitable material such as steel.

Each slider main member 122 is a generally C-shaped cross-section channel structure made of a suitable metal material, such as steel, other metals or composite material. Each slider main member 122 has an upper or first portion 130 (FIGS. 3 and 5) that serves as a substantially planar and upper surface 128 of the slider main member. The first portion 130 generally may extend substantially horizontal and is subject to a majority of vertical loading from the heavy-duty vehicle. A second portion 132 of each slider main member 122 is oriented substantially perpendicular to the first portion 130 and generally may extend substantially vertical. The second portion 132 of each slider main member 122 has a second portion outboard surface 133 of the slider main member. The second portion 132 of each slider main member 122 includes a transition portion 134 that connects the first portion 130 at a bent corner of each slider main member. The transition portion 134 of each slider main member 122 faces outboard from the slider assembly 120.

Figure 3:
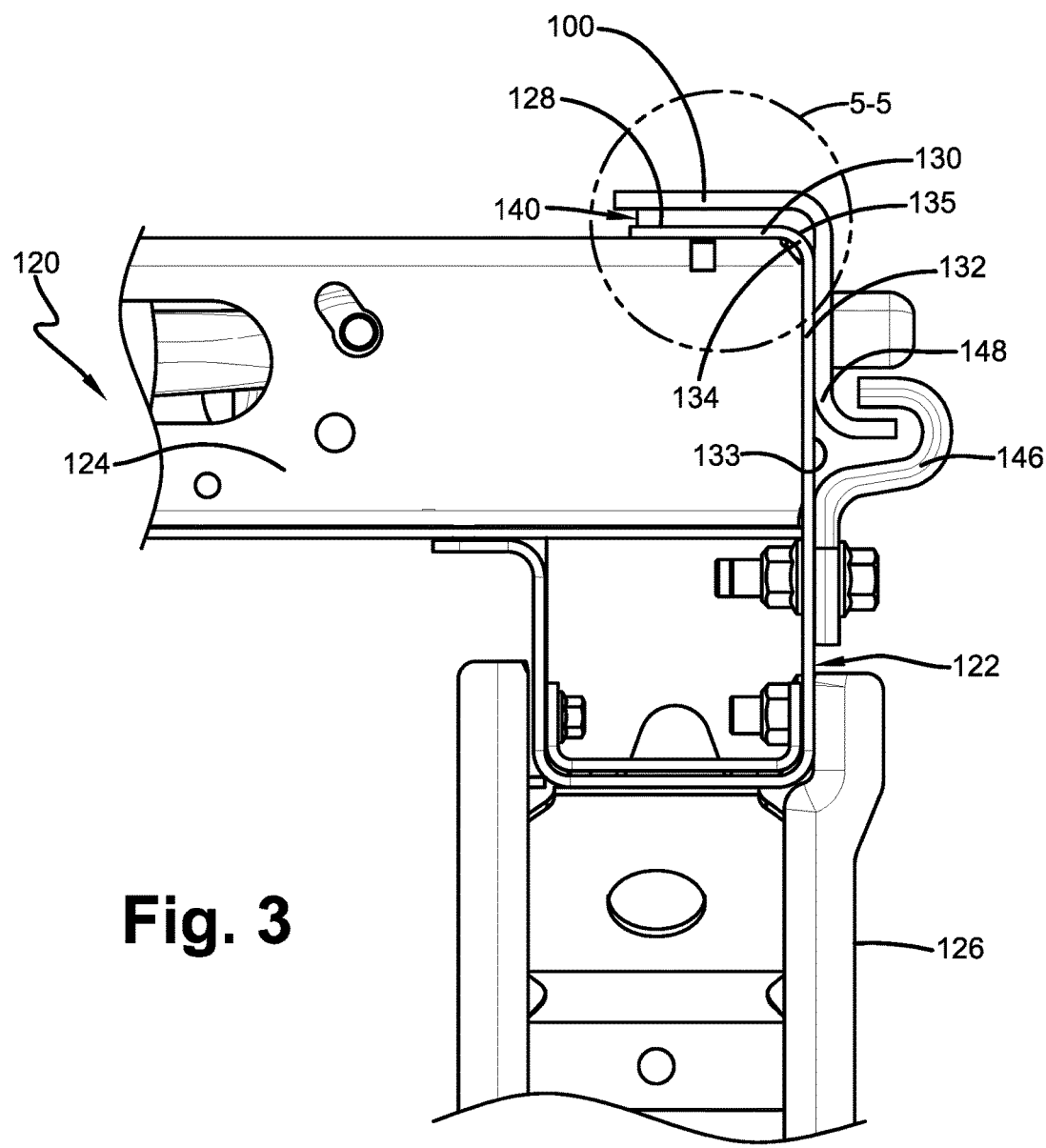
FIG. 3 is a fragmentary cross-sectional view of the slider assembly showing a friction reducing slider wear pad attached to a main frame member of the slider assembly and showing the slide assembly mounted on a primary frame member of the heavy-duty vehicle, taken approximately along the line 3-3 in FIG. 2.

The open portions of each C-shaped slider main member 122 face one another when connected together by the slider cross-members 124. Each end of each slider cross member 124 may nest in the open portion of a respective one of slider main members 122, as illustrated in FIGS. 2-3, and is secured by suitable means such as welding or mechanical fastening. A plurality of rail guides 146 (only one shown in FIG. 3) is mounted to the second portion outboard surface 133 of each respective slider main member 122. The rail guides 146 on each side of the slider assembly 120 receive an elongate and longitudinally extending rail 148 of the primary frame member 100 of the heavy-duty vehicle. The rail guides 146 and rail 148 cooperate to direct movement of and help maintain alignment between the main members 122 of the slider assembly 120 and the primary frame members 100 of the heavy-duty vehicle.

The slider subframe or slider assembly 120 is slidably movable relative to the primary frame of the heavy-duty vehicle. At least a pair of the improved friction reducing slider wear pads 140 are attached to each respective one of the slider main members 122. The friction reducing slider wear pads 140 engage the main member 122 of the slider assembly 120 to facilitate movement relative to the primary frame of the heavy-duty vehicle.

Figure 4A:
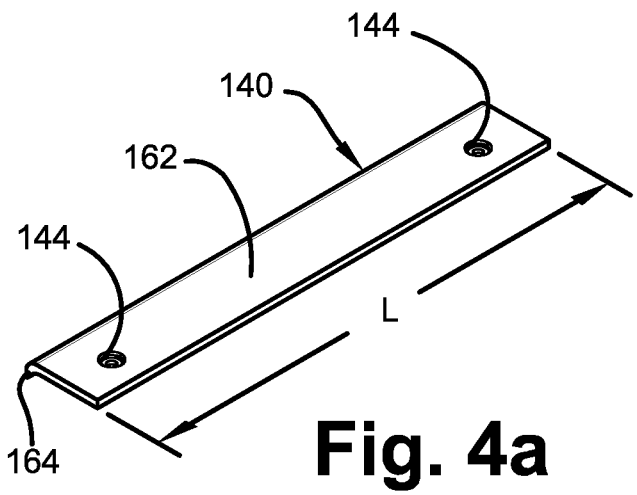
FIG. 4a is an enlarged perspective top view of the friction reducing slider wear pad illustrated in FIG. 2.
Figure 4B:
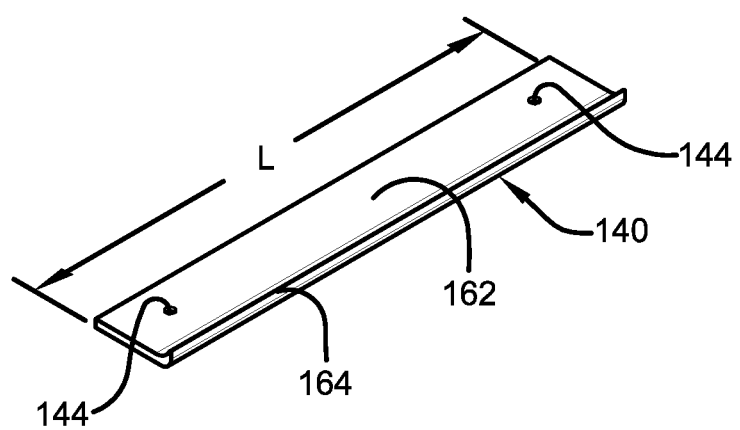
FIG. 4b is an enlarged perspective bottom view of the friction reducing slider wear pad illustrated in FIG. 2.

For example, a plurality of longitudinally spaced apart improved friction reducing slider wear pads 140, constructed according to an aspect of the subject disclosure, is attached to the upward facing surface 128 of the first portion 130 of each slider main member 122, as illustrated in FIG. 2. Each friction reducing slider wear pad 140 is attached to a respective slider main member 122 by a pair of longitudinally spaced apart fasteners 142 extending through a respective recessed opening 144 formed in the friction reducing slider wear pad. Each friction reducing slider wear pad 140 has a length L (FIGS. 4a and 4b) that is substantially smaller than the length M of a respective slider main member 122 and the length of a prior art low friction strip 40. It is contemplated that other suitable attachment means for the friction reducing slider wear pad 140 could be employed, for example brackets or adhesives.

For example, each slider main member 122 has four improved friction reducing slider wear pads 140 attached as illustrated in FIG. 2. It will be appreciated that any suitable number of the improved friction reducing slider wear pads 140 may be employed on the slider assembly 120. By way of example, each friction reducing slider wear pad 140 has a length L that is less than half of the length M of the slider main member 122, and preferably less than about 25% of the length M and spaced apart an even distance D (FIG. 2) that is preferably less than about 20% of the length M of the slider main member. It will be appreciated that the friction reducing slider wear pads 140 could be used in different quantities and have different lengths L and spaced apart distances D. The friction reducing slider wear pads 140 may be made from any suitable friction reducing material, such as a polymer. The polymer material of the friction reducing slider wear pad 140 may be an ultra-high molecular weight polyethylene.

Each friction reducing slider wear pad 140 is supported on and attached to the upper surface 128 of the first portion 130 (FIGS. 3 and 5) of the slider main member 122. The friction reducing slider wear pads 140 provide a smooth, relatively low friction contact surface to facilitate slidable movement of slider assembly 120 relative to the primary frame of the heavy-duty vehicle. The slider assembly 120 is selectively positioned longitudinally relative to a primary frame member 100 of the heavy-duty vehicle for a desired load distribution or vehicle maneuverability, as is known. At least one lock pin mechanism (not shown) may engage the slider main member 122 and the primary frame of the heavy-duty vehicle to fix the position of the slider assembly 120 relative to the heavy-duty vehicle primary frame, in a known manner.

Figure 5:
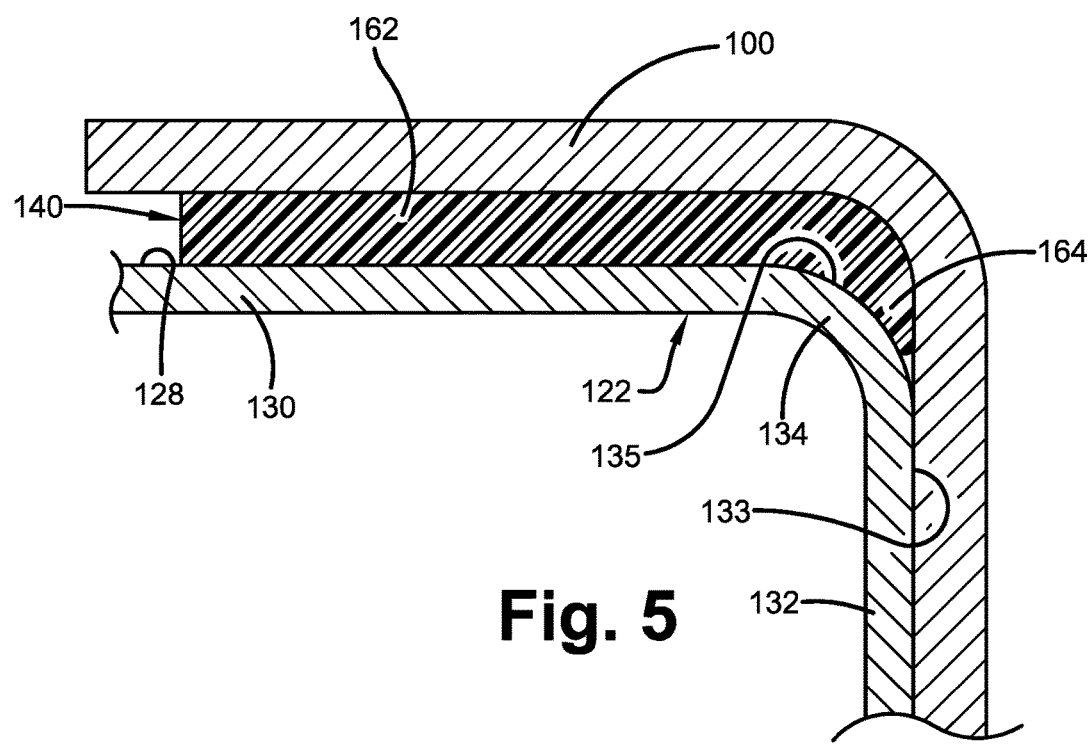
FIG. 5 is an enlarged fragmentary cross-sectional view of a friction reducing slider wear pad located between a primary frame member of the heavy-duty vehicle and a main frame member of the slider assembly, taken approximately from the circle 5-5 of FIG. 3.

The friction reducing slider wear pad 140 is formed to have a slightly hook shaped cross-section as best illustrated in FIGS. 3 and 5. That is, each of the friction reducing slider wear pads 140 has a first segment 162 adapted to be disposed between the first portion 130 of the slider main member 122 and the primary frame member 100 of the heavy-duty vehicle to absorb vertical loading. The first segment 162 of friction reducing slider wear pad 140 is attachable to the upper surface 128 of the first portion 130 of the slider main member 122 by suitable means, such as recessed fasteners 142 and/or an adhesive.

A lip or second segment 164 of the friction reducing slider wear pad 140 extends generally transverse or at an angle relative to the first segment 162. The lip or second segment 164 is integrally formed as one piece with the first segment 162. The lip or second segment 164 engages and/or covers at least part of the transition portion outboard surface 135 of at least the transition portion 134 of the slider main member 122. The lip or second segment 164 may also engage and/or cover part of the second portion outboard surface 133 of the second portion 132 of the slider main member if the lip or second segment 164 extends beyond what is shown in FIG. 5. By engaging at least part of the transition portion outboard surface 135 of the transition portion 134, the lip or second segment 164 of the friction reducing slider wear pad 140 resists inboard lateral movement or inboard transverse displacement of the friction reducing slider wear pad 140 relative to the slider main member 122 to eliminate or minimize scrubbing and/or extrusion. Optionally, the lip or second segment 164 may also be fastened and/or adhered to the slider main member 122.

Each friction reducing slider wear pad 140 has a pair of openings 144 (FIGS. 2, 4a and 4b) extending through the first segment 162. Each of the openings 144 is located near opposite end portions of the friction reducing slider wear pad 140. It will be apparent however that the openings 144 could be placed at any suitable location along the friction reducing slider wear pad 140. The fastener 142, such as a screw or a bolt, extends through a respective opening 144 and into or through a corresponding aligned opening (not shown) formed in the first portion of the main member 122 to attach the friction reducing slider wear pad 140 to the main member of the slider assembly 120. The entire head of each fastener 142 is located below the upper surface of the friction reducing slider wear pad 140. This can be done by recessing, countersinking or counterboring the openings 144 depending on the type of fastener 142 that is used, as is known.

Friction reducing slider wear pads 140 of the subject disclosure have exhibited an improved ability to withstand lateral, longitudinal and vertical load conditions, provide lateral and longitudinal support to slider assembly 120 that may be encountered when the heavy-duty vehicle performs turns, rolls during lane change maneuvers and/or impact with curbs when cornering and/or direct impact with potholes. The configuration of the friction reducing slider wear pads 140 resists or prevents inboard movement relative to the slider main member 122 to at least minimize scrubbing and/or extrusion. The friction reducing slider wear pads 140 of the subject disclosure also expand longitudinally by a relatively lesser overall amount than the prior art low friction strips 40, due to their relatively short length L compared to the length M of the slider main member 122 of which the length of the prior art low friction strips 40 approximates. Thus, the friction reducing slider wear pads 140 of the subject disclosure have less of a chance to separate from the fasteners 142 that attach the friction reducing slider wear pads to the main members 122. The friction reducing slider wear pads 140 of the subject disclosure employs relatively less material on each slider main member 122 than the prior art low friction strips 40 to reduce material costs and are relatively easy to install.

In the foregoing description, certain terms have been used for brevity, clarity and understanding, but no unnecessary limitations are to be implied because such terms are used for descriptive purposes and are intended to be broadly construed. Moreover, the description and illustration of the subject disclosure is by way of example, and the scope of the subject disclosure is not limited to the exact details shown or described.

It is to be understood that the structure of the improved friction reducing slider wear pads 140 and location along the main member 122, may be modified, altered or rearranged without affecting the overall concept or operation of the subject disclosure. For example, different lengths, different arrangements, different shapes, different materials and different attachment methods of the friction reducing slider wear pads 140 may be employed. In addition, the improved friction reducing slider wear pad 140 may be employed with other types, sizes and configurations of frames other than those shown and described.

It is understood that the configuration and size of the improved friction reducing slider wear pad 140 shown and described is for use with a slider assembly 120 having any number of axles. The number of axles carried by the slider assembly 120 does not affect the overall concept of the subject disclosure. It is contemplated that the size and/or shape of the improved friction reducing slider wear pad 140 can be modified for use with other slider assembly constructions. It is also understood that the improved friction reducing slider wear pad 140 can be adapted to perform other functions where friction reducing material is needed between relatively movable parts. It is contemplated that the second segment 164 of the friction reducing slider wear pad 140 may be mounted to the main member 122 to engage and/or cover at least part of the inboard side of the slider main member. It is also contemplated that the friction reducing slider wear pad 140 has another segment, similar to the second segment 164 on an opposite side of the friction reducing slider wear pad, that may engage and/or cover at least part of the inboard side of the slider main member 122. It is further contemplated that the friction reducing slider wear pad 140 may have a pair of segments, each being similar to the second segment 164, on opposite sides of the friction reducing slider wear pad and be mounted to the main member 122 to engage and/or cover at least part of both the outboard side and inboard side of the slider main member.

The subject disclosure has been described and illustrated with reference to at least one aspect, implementation or function. It is understood that this description and illustration is by way of example and not by way of limitation. Potential modifications, alterations and equivalents will occur to others upon a reading and understanding of the subject disclosure, and it is understood that the subject disclosure includes all such modifications, alterations and equivalents.

What is claimed is:

1. A slider suspension system for use on a heavy-duty vehicle, the slider suspension system comprising:
   a slider assembly having at least one elongate main member that is movable in a first direction along an extent of the main member relative to a primary frame member of the heavy-duty vehicle, the main member having a first portion facing the primary frame member of the heavy-duty vehicle, the main member having a second portion extending substantially perpendicular to the first portion;
   at least one friction reducing slider wear pad fixed to one of the main members, the friction reducing slider wear pad is interposed between the main member of the slider assembly and the primary frame member of the heavy-duty vehicle; and
   a first segment of the friction reducing slider wear pad fixed to the first portion of the main member, the friction reducing slider wear pad also having a second segment adapted to engage at least a part of the second portion of the main member and inhibit movement of the friction reducing wear pad relative to the main member in a second direction transverse to the first direction.

2. The slider suspension system of claim 1 further including a transition portion of the main member of the slider assembly connecting together the first portion and the second portion, the second segment of the friction reducing slider wear pad engaging at least a portion of the transition portion of the main member.

3. The slider suspension system of claim 2 wherein the transition portion of the main member of the slider assembly faces in an outboard direction.

4. The slider suspension system of claim 1 wherein the friction reducing slider wear pad is made from a polymeric material.

5. The slider suspension system of claim 4 wherein the polymeric material includes ultra-high molecular weight polyethylene.

6. The slider suspension system of claim 1 further including at least a pair of friction reducing slider wear pads fixed to the main member of the slider assembly and interposed between the main member of the slider assembly and the primary frame member of the heavy-duty vehicle.

7. The slider suspension system of claim 1 further including at least a pair of friction reducing slider wear pads fixed to the main member, each friction reducing slider wear pad having a length less than one half of the length of the main member.

8. The slider suspension system of claim 1 wherein the at least one friction reducing slider wear pad is fixed to the main member of the slider assembly by fasteners.

9. A slider subframe for a heavy-duty trailer having a primary frame, the slider subframe comprising:
   a pair of spaced apart and substantially parallel extending elongate main members, each of the main members having a first portion formed to extend substantially perpendicular to a second portion at a transition portion, the main members are moveable relative to the primary frame in a longitudinal direction;
   a pair of spaced apart of cross members connecting the main members;
   two pair of friction reducing slider wear pads, each pair of friction reducing slider wear pads being attachable to a respective one of the main members and to be located between the main member and the primary frame, each friction reducing slider wear pad having a length less than one half of the length of the main member;
   a first segment of the friction reducing slider wear pad attached to the first portion of the main member; and
   a second segment of the friction reducing slider wear pad extending at an angle relative to the first segment, the second segment engaging at least the transition portion of the main member to resist lateral movement of the friction reducing slider wear pad relative to the main member to minimize scrubbing of the friction reducing slider wear pad.

10. The slider subframe of claim 9 wherein the transition portion of the main member faces in an outboard direction.

11. The slider subframe of claim 9 wherein the friction reducing slider wear pad is made from a polymeric material.

12. The slider subframe of claim 11 wherein the polymeric material includes ultra-high molecular weight polyethylene.

13. A slider wear pad used on a heavy-duty vehicle with a primary frame, the slider wear pad is attachable to a slider subframe having a main subframe member, the slider wear pad comprising:
   a first segment for attachment to the main subframe member and to be located between the main subframe member and the primary frame of the heavy-duty vehicle;
   a second segment extending at an angle relative to the first segment, the second segment for engaging a portion of the main subframe member to resist transverse movement of the slider pad relative to the main subframe member; and
   the first and second segments being integrally formed as one piece and formed of a friction reducing ultra-high molecular weight polyethylene polymeric material.

14. The slider wear pad of claim 13 wherein the main member of the slider subframe includes a first portion and a second portion extending transverse to the first portion, the second portion of the main member is located outboard of the first portion of the main member to resist inboard transverse movement of the slider pad relative to the main subframe member.

15. The slider wear pad of claim 13 wherein the polymeric material includes ultra-high molecular weight polyethylene.

16. The slider wear pad of claim 13 wherein the friction reducing slider wear pad has a length less than one half of the length of the main subframe member.

* * * * *